United States Patent [19]

Cowen

[11] Patent Number: 4,682,846
[45] Date of Patent: Jul. 28, 1987

[54] HERMETIC HIGH PRESSURE FIBER OPTIC BULKHEAD PENETRATOR

[75] Inventor: Steven J. Cowen, San Diego, Calif.

[73] Assignee: The United States of America as represented by the Secretary of the Navy, Washington, D.C.

[21] Appl. No.: 322,808

[22] Filed: Nov. 19, 1981

[51] Int. Cl.⁴ ............................................... G02B 6/32
[52] U.S. Cl. .................................................. 350/96.18
[58] Field of Search ...................................... 350/96.18

[56] References Cited

U.S. PATENT DOCUMENTS

| | | | |
|---|---|---|---|
| 3,751,655 | 8/1973 | Codrino | 240/8.16 |
| 3,813,514 | 5/1974 | Canty | 219/354 |
| 3,825,320 | 7/1974 | Redfern | 350/96 B |
| 4,214,809 | 7/1980 | Reh | 350/96.20 |
| 4,222,629 | 9/1980 | Dassele et al. | 350/96.20 |
| 4,253,729 | 3/1981 | Rocton | 350/96.20 |
| 4,360,249 | 11/1982 | Slemon | 350/96.18 |

*Primary Examiner*—Robert E. Wise
*Attorney, Agent, or Firm*—Robert F. Beers; Ervin F. Johnston; Thomas G. Keough

[57] ABSTRACT

A method and apparatus of transmitting optical data through a wall separating a first fiber in a first medium from a second fiber in a higher pressure medium assures optical information transfer. A bore is provided in the wall having an inwardly extending annularly rim. A cylindrically-shaped optical glass plug is sized to fit within the bore and configured to abut the annular rim and a hard solder seal, a ceramic seal or a fused frit is disposed between the bore and the glass plug to hermetically seal one side of the wall from the other. A quarter-pitch graded-index of refraction rod lens contacts opposite sides of the optical glass plug and the first and second optical fiber are held in an aligned relationship with the rod lenses and glass plug to assure bidirectional transmission of optical data. The apparatus and method assure reliable optical transmission with long term stabilities in high pressure differentials.

8 Claims, 1 Drawing Figure

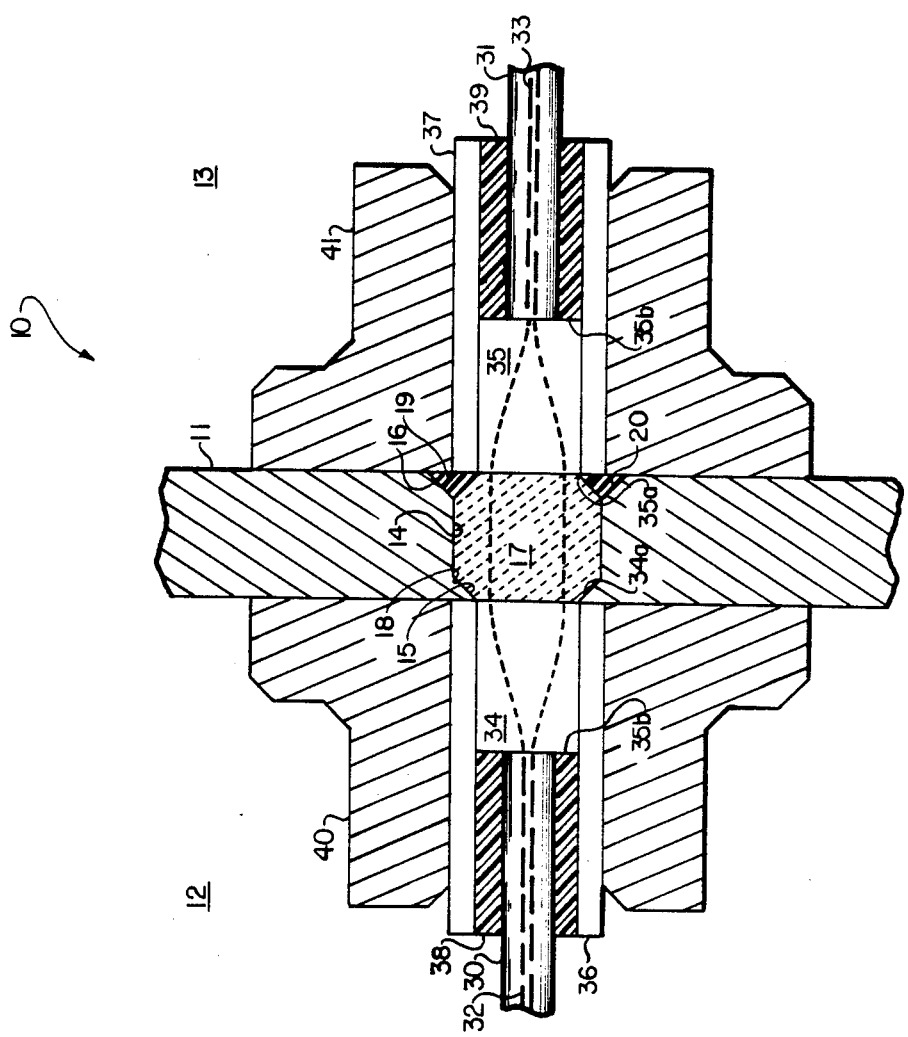

HERMETIC HIGH PRESSURE FIBER OPTIC BULKHEAD PENETRATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The increasing use of fiber optics for data transmission has extended to undersea instrumentation and submersibles. The fiber optics, in addition to their well known data transmission capabilities, have certain advantages for penetrating a high pressure hull. One in particular is that their small size reduces the problems normally associated with pressure hull penetrations by bulky metal conductors.

One proven approach is disclosed by John T. Redfern in his U.S. Pat. No. 3,825,320 entitled "High-Pressure Optical Bulkhead Penetrator". A cylindrical or tapered plug of glass or cylindrical or tapered bundle of fiber optics is bonded within an accommodatingly shaped bore in a bushing. However, because O-rings and resin adhesives were included to hermetically seal the penetration, possibly, limitations of this design might arise. Each penetrator assembly must be individually tested for pressure integrity in conjunction with the cable it is to be used. Experiences have demonstrated that adhesive boundaries may not be hermetic because most epoxies and polymers at least permit the passage of vapor over a period of time under the extreme pressures encountered in deep ocean applications. In some penetrators "creep" of the adhesive may create leaks. In addition, the smallness of the dimension of the ferrules inserted into the Redfern penetrator may affect alignment of the fibers and compromise the data transfer capability of the penetrator.

The "Fiber Optic Connector Assembly" of Michael A. Dassel, et al., disclosed in U.S. Pat. No. 4,222,629 provides a hermetically sealed coupler. Glass frit bonding fuses the whole arrangement together so that failure of anything from the fiber to the electrooptic conversion element requires that the whole assembly be discarded. If a different electrooptic function is desired, the whole unit must be replaced.

Thus, there is a continuing need in the state-of-the-art for a hermetically sealed high-pressure transparent window adaptable for the transmission of optical data that enhances the light coupling capabilities yet does not overly compromise the wall's structural integrity.

SUMMARY OF THE INVENTION

The present invention is directed to providing an apparatus and method for assuring the transmission of optical data through a wall separating a first optical fiber disposed in a first medium from a second optical fiber disposed in a higher pressure second medium. A bore through the wall is provided with an inwardly extending annular rim for receiving a cylindrically-shaped optical glass plug sized to fit within the bore and configured to abut on the annular rim. A hard solder seal, ceramic seal or fused frit is provided between the cylindrically-shaped plug and the inner wall of the bore to seal the penetration through the wall and one-quarter pitch graded index of refraction rod lenses are disposed adjacent the opposite faces of the cylindrically-shaped glass plug. The optical fibers are held against the one-quarter pitch graded index of refraction rod lenses by a cured adhesive to ensure that optical data is transmitted.

A prime object of the invention is to provide an optical window assembly having improved pressure integrity while providing an optical data transmission channel.

Yet another object of the invention is to provide a hermetically sealed hull penetrator having excellent long-term stability which avoids the problems associated with numerous adhesives.

Still another object is to provide an improved optical data wall penetrator enabling the selective coupling of a number of fibers without compromising the pressure integrity.

Still another object is to provide a hull penetrator being thin and of small diameter yet being capable of withstanding significant pressure differentials.

Another object is to provide an optical hull penetrator capable of being cascaded where pressure considerations require and also having a limited fail-safe capability when over-pressures are encountered.

Yet a further object is to provide an optical hull penetrator demonstrating exceptional stability to temperature cycling due to the close match in temperature coefficients in certain glass-metal combinations.

A further object is to provide an improved optical wall penetrator not requiring precise alignment tolerances of the oppositely mounted fiber optic connector assemblies.

These and other objects of the invention become more apparent from the ensuing description and claims when taken with the appended drawings.

BRIEF DESCRIPTION OF THE DRAWING

The drawing depicts a representative embodiment of the salient features of this inventive concept.

DESCRIPTION OF THE PREFERRED EMBODIMENT

Referring now to the drawing, the improved wall penetrator 10 is mounted in a wall or bulkhead 11 that separates a first medium 12 from a second medium 13. The first medium can be at atmospheric pressure, for example, inside an instrumentation package or submersible, while the second medium can be pressurized many times higher such as that encountered in the ocean at extreme depths. In any event, the wall is sufficiently stressed to withstand the pressured differential across it.

A lateral bore 14 extends nearly all the way through wall 11. An annular rim or projection 15 is provided as an integral projection of the wall within the bore and an annular cut 16 is machined in the wall at the opposite end of the bore. The bore and the annular projection are specifically shaped to receive an essentially, cylindrially-shaped optical glass plug 17 configured with a ring-shaped recess 18 that accommodates the annular rim 15 in an abutting relationship and an annular recess 19 at its opposite end.

The fitting of the optical glass plug against the inside of the bore and on the annular rim allows the optical glass plug to partially serve at a pressure barrier window that prevents leakage due to pressure differential or vapor diffusion. Annular recess 19 cooperates with the annular cut 16 provided in the hull to receive a glass such as BK-7 glass 20 brazed into the recesses using a platinized, hard soldering technique. Optionally, a ceramic seal or a fused frit can be employed.

Thusly, provided, an optical window is formed in wall 11 which does not overly compromise the wall's structural integrity. The opposite exposed ends of the optical glass plug 17 as well as the annular glass braze 20 are lapped and polished to yield optical quality window surfaces. The dimensions of such an optical window need be no more than those necessary to receive light transmitted between a pair of optical fibers 30 and 31. The cores 32 and 33 of such fibers need be no more than a few microns so that the optical window can be less than a fraction of a centimeter in diameter.

A pair of one-quarter graded refractive index rod lenses 34 and 35 are placed within a cylindrically shell-shaped cylinder 36 and 37. The rod lenses may be of the type manufactured by the Nippon Electric Corporation and marketed under the trademark SELFOC. The ends of the rod lenses and their encircling cylinder are coplanar so that surfaces 34a and 35a abut the polish exposed surfaces of optical glass plug 17.

Fibers 30 and 31 are held against the opposite ends 34b and 35b of the quarter pitch rod lenses by cured resin adhesive 38 and 39.

Light emanating from either of the fibers is collimated in its adjacent quarter pitch graded index of refraction rod lens into a beam of light which passes through hermetically sealed optical glass plug 17. The collimated light beam is gathered and focussed on the opposite side of the window and directed onto the other fiber by the rod lenses associated with the opposite fiber. The pressure alignment is not critical and several fibers could be employed on either side to pass several optical data signals simultaneously. The inventive concept also assures that bidirectional transmission can occur.

Precision sleeves-fitting 40 and 41 align the elements. An adhesive can be provided to grip the outer surfaces of the walls. The sleeves serve to align the cylindrical shells 36 and 37 to hold the fibers in their aligned position. Obviously, a mechanical arrangement affixed to the hull and provided with mating threads can be employed. True hermetic seals capable of excellent long-term stability are created by the plug seating on the annular projection and the brazed glass seal 20. The use of high temperature glass-to-metal sealing technology eliminates the possibility of long-term "creep" which is inherent in epoxy type resins.

The thin small diametered windows are fabricated which exhibit enormous pressure and shock tolerance while providing a thin overall cross section. The use of the SELFOC imaging rods operated in a hydrostatic environment does not create any link stresses along their lengths or diameters. All hydrostatic stresses are born by the optical glass window.

When breakage or spalling due to over pressure does occur, the breakage is a result of excessive plug deflecture which causes the plug of the glass window to fracture into planes parallel to the surfaces. While permanently degrading the optical properties of the penetrator, these failures have never incurred a loss of water integrity in test units even when the units were subjected to pressures four times greater than those encountered at the maximum design depth.

Because of the collimated nature of the light transferred to the optical glass plug, it is possible to cascade two windows made of such plugs if double redundancy is necessitated. The structure of the unit was exceptionally stable with respect to temperature cycling due to the close match in temperature coefficients which is possible by selecting certain glass-to-metal combinations. Due to the substantial cross-sectional area of the collimated light beam traversing the optical glass plug, translational alignment tolerances of the fibers are relaxed and transferred to angular tolerances which are less difficult to obtain in practice.

Any combination of imaging objects and pressure windows can be fabricated by applying the teachings of this inventive concept. Because a coherent image is transferred by the device, it is possible to image a number of optical fibers simultanesouly through a single window by employing spatial separation of the individual fiber elements at the inputs and outputs of the focusing optics. The hermetic nature of the device makes it attractive in dangerous applications such as those involving explosive fumes, nuclear radiation and high hydrostatic pressures.

Obviously, many other modifications and variations of the present invention are possible in the light of the above teachings. It is therefore to be understood that within the scope of the appended claims the invention may be practiced otherwise than as specifically described.

What is claimed is:

1. An apparatus assuring the transmission of optical data through a wall separating a first optical fiber disposed in a first medium from a second optical fiber disposed in a higher pressure second medium comprising:
   a bore provided in the wall being shaped with an annular cut at one end and having a rim extending therein at its opposite end;
   an essentially cylindrically-shaped glass plug sized to fit in the bore and configured with a ring-shaped recess on one end to rest on the rim and further configured with an annular recess on its opposite end for providing an optically transparent window;
   means disposed between the cylindrically-shaped glass plug in its annular recess and in the annular cut in the one end of the bore for hermetically sealing the first medium from the second medium;
   a first one-quarter pitch graded refractive index rod lens disposed between the end of the first optical fiber and the cylindrically-shaped glass plug for collimating optical data therethrough; and
   a second one-quarter pitch graded refractive index rod lens disposed between the end of the second optical fiber and the cylindrically-shaped glass plug and being aligned with the first one-quarter pitch graded refractive index rod lens, for collimating optical data therethrough.

2. An apparatus according to claim 1 in which the hermetically sealing means is glass brazed into the annular cut of the bore and the annular-shaped recess in the essentially cylindrically-shaped glass plug in a platinized cold soldering technique that cooperates with the ring-shaped recess in the essentially cylindrically-shaped plug resting on the rim in the bore.

3. An apparatus according to claim 1 in which the hermetically sealing means is a ceramic seal in the annular cut of the bore and the annular-shaped recess in the essentially cylindrically-shaped glass plus that cooperates with the ring-shaped recess in the essentially cylindrically-shaped plug resting on the rim of the bore.

4. An apparatus according to claim 3 further including:

a first fitting connected to the first one-quarter pitch graded refractive index rod lens and the wall for holding it against the cylindrically-shaped glass plug; and a second fitting connected to the second one-quarter pitch graded refractive index rod lens and the wall for holding it against the cylindrically-shaped glass plug.

5. An apparatus according to claim 4 further including:

a first cured resin cylinder carried on the first one-quarter pitch graded refractive index rod lens for positioning the end of the first fiber in an aligned relationship; and a second cured resin cylinder carried on the second one-quarter pitch graded refractive index rod lens for positioning the end of the second fiber in an aligned relationship.

6. An apparatus according to claim 1 in which the hermetically sealing means is a fused frit in the annular cut of the bore and the annular-shaped recess in the essentially cylindrically-shaped glass plug that cooperates with the ring-shaped recess in the essentially cylindrically-shaped plug resting on the rim of the bore.

7. An apparatus according to claim 6 further including:

a first fitting connected to the first one-quarter pitch graded refractive index rod lens and the wall for holding it against the cylindrically-shaped glass plug; and a second fitting connected to the second one-quarter pitch graded refractive index rod lens and the wall for holding it against the cylindrically-shaped glass plug.

8. An apparatus according to claim 7 further including:

a first cured resin cylinder carried on the first one-quarter pitch graded refractive index rod lens for positioning the end of the first fiber in an aligned relationship; and a second cured resin cylinder carried on the second one-quarter pitch graded refractive index rod lens for positioning the end of the second fiber in an aligned relationship.

* * * * *